(12) United States Patent
Ive et al.

(10) Patent No.: US 12,296,682 B2
(45) Date of Patent: May 13, 2025

(54) ROAD VEHICLE EQUIPPED WITH INTEGRATED CONTENT DISPLAY DEVICE

(71) Applicant: FERRARI S.P.A., Modena (IT)

(72) Inventors: Jonathan P. Ive, San Francisco, CA (US); Eugene Whang, San Francisco, CA (US); Jeremy Bataillou, San Francisco, CA (US); Anthony Ashcroft, San Francisco, CA (US); Suhang Zhou, San Francisco, CA (US); Benoit Louzaouen, San Francisco, CA (US); Jemima Kiss, San Francisco, CA (US); Christopher Wilson, San Francisco, CA (US); Wan Si Wan, San Francisco, CA (US); Biotz Natera, San Francisco, CA (US); James Mcgrath, San Francisco, CA (US); Roger Guyett, San Francisco, CA (US); Joseph Luxton, San Francisco, CA (US); Michael Matas, San Francisco, CA (US); Patrick Kessler, San Francisco, CA (US); Patrizio Moruzzi, Modena (IT); Vito Conigliaro, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/498,450

(22) Filed: Oct. 31, 2023

(65) Prior Publication Data
US 2024/0149681 A1    May 9, 2024

(51) Int. Cl.
*B60K 35/22*    (2024.01)
*B60K 35/50*    (2024.01)
*B60K 35/81*    (2024.01)

(52) U.S. Cl.
CPC ............ *B60K 35/223* (2024.01); *B60K 35/50* (2024.01); *B60K 35/81* (2024.01); *B60K 2360/66* (2024.01)

(58) Field of Classification Search
CPC .................................................. B60K 35/223
See application file for complete search history.

(56) References Cited

U.S. PATENT DOCUMENTS

| 2002/0166273 A1 | 11/2002 | Nakamura et al. |
| 2023/0254986 A1 | 8/2023 | Wall |

FOREIGN PATENT DOCUMENTS

| DE | 102019203264 B3 * | 4/2020 |
| DE | 102020116984 B3 | 9/2021 |

(Continued)

OTHER PUBLICATIONS

Extended European Search Report for European Patent Application No. 23206017.8, Date of Mailing: Jun. 18, 2024, 8 pages.

(Continued)

*Primary Examiner* — Sean P Gramling
(74) *Attorney, Agent, or Firm* — CANTOR COLBURN LLP

(57) ABSTRACT

A road vehicle comprising a vehicle dashboard, comprising in turn an exposed surface visible from within the passenger compartment; a content display device comprising a projection device which can be rolled up and unrolled, provided with a foldable screen; the projection device further comprising a support structure on which the rear main surface of the foldable screen is mounted; the support structure being rollable and unrollable around a winding axis, arranged within the vehicle dashboard; the vehicle dashboard further comprising a slit on the exposed surface and configured to (Continued)

be traversed by the foldable screen and by the support structure during the rolling up and/or unrolling of the projection device.

8 Claims, 4 Drawing Sheets

(56) References Cited

FOREIGN PATENT DOCUMENTS

| | | |
|---|---|---|
| DE | 102020116986 B3 | 11/2021 |
| EP | 1637387 B1 | 6/2009 |
| EP | 2755075 A1 | 7/2014 |
| EP | 3107083 A1 | 12/2016 |
| EP | 3526070 B1 | 12/2020 |

OTHER PUBLICATIONS

Italian Search Report for Application No. 202200022707; Filing Date: Nov. 4, 2022; Date of Mailing: Jun. 8, 2023; 6 pages.

\* cited by examiner

ROAD VEHICLE EQUIPPED WITH INTEGRATED CONTENT DISPLAY DEVICE

CROSS-REFERENCE TO RELATED APPLICATIONS

This patent application claims priority from Italian patent application no. 102022000022707 filed on Nov. 4, 2022, the entire disclosure of which is incorporated herein by reference.

TECHNICAL FIELD

The present invention concerns a road vehicle provided with an integrated content display device.

In particular, the present invention is advantageously, but not exclusively, applied in a high-performance road vehicle, to which the following description will explicitly refer without loss of generality.

BACKGROUND TO THE INVENTION

Generally, road vehicles are provided with a plurality of display devices arranged on the dashboard of the road vehicle.

Historically, each road vehicle comprises at least one display device for the driver, for example the screens or indicators arranged on the vehicle instrument panel, namely on the portion of dashboard interposed between the steering wheel and the windscreen.

In recent years, said devices can be assisted by other screens (for example at least one screen arranged centrally on the dashboard or a head-up display) which complete display of the information for the driver.

In general, the arrangement of an increasingly large central screen is becoming increasingly popular, especially in fully electric cars; however, in the majority of cases, said central screens protrude from the dashboard to which they are connected, dominating it or creating an anti-aesthetic effect, nullifying part of the work of the interior designers who define the shape and curves of the dashboard.

In fact, for technical reasons, the screens in modern cars look like independent elements, not perfectly blended in with the style of the road vehicle in which they are installed.

In particular, the inclusion of a retractable screen represents a considerable problem in terms of overall dimensions, since the dashboard is almost entirely occupied, in the central portion, by the air conditioning system. Therefore, the housing of large screens within the dashboard is the impediment that has resulted in road vehicle manufacturers sacrificing the harmony of the interior design to the need for the installation of said screens.

The document DE102020116986 and the document DE102020116984 describe a display device adjustable between two extracted positions.

The document WO2018069699 describes an instrument panel comprising a rotation mechanism.

The document EP2755075 describes a display device that can be folded away by rotation around a hinge of a head-up display.

The document EP3107083 describes a roll-up display for a television set.

In general, the need is therefore felt to increase the integration of vehicle content display systems, allowing the driver and the passenger a clear view of the screen without having to sacrifice the aesthetics, as happens when a rectangular screen is imposed in the centre of the dashboard.

DESCRIPTION OF THE INVENTION

The object of the present invention is to provide a road vehicle equipped with an integrated content display device which is at least partially free from the above drawbacks and, at the same time, is easy and inexpensive to produce.

According to the present invention a road vehicle is provided equipped with an integrated content display device as claimed in the following independent claims and, preferably, in any one of the claims depending directly or indirectly on the independent claims.

The claims describe preferred embodiments of the present invention forming an integral part of the present description.

BRIEF DESCRIPTION OF THE DRAWINGS

Below, some embodiments of the invention will be described for a better understanding thereof by way of non-limiting example and with reference to the attached drawings in which.

EMBODIMENTS OF THE INVENTION

Figure 1:
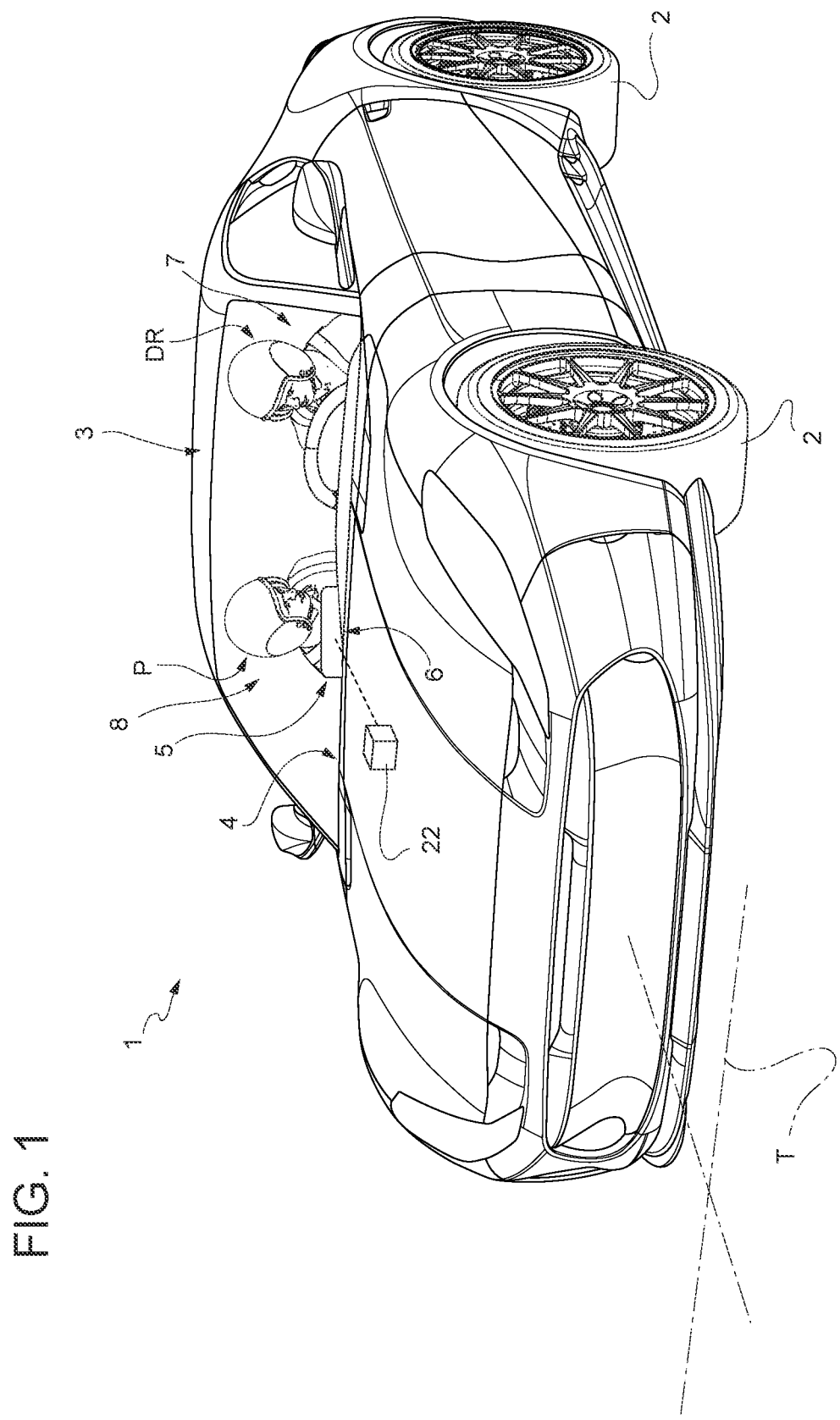
FIG. 1 is a perspective schematic view, with details removed for clarity, of a possible embodiment of a road vehicle in accordance with the present invention.

In FIG. 1, the number 1 indicates overall a road vehicle provided with two front wheels 2 and two rear wheels 2 (in particular driving wheels). The vehicle 1 is provided with a passenger compartment 3 which is adapted to house at least one driver DR and preferably one or more passengers P, of which at least one alongside the driver DR as illustrated in FIG. 1.

The same reference numbers and letters in the figures identify the same elements or components with the same function.

In the context of the present description the term "second" component does not imply the presence of a "first" component. Said terms are employed as labels to improve clarity and should not be understood in a limitative manner.

The elements and the characteristics illustrated in the different preferred embodiments, including the drawings, can be combined with or isolated from one another without departing from the protective scope of the present application as described below.

Furthermore, the road vehicle 1 comprises a frame (of known type and therefore not illustrated in detail), and a vehicle dashboard 4 inside the passenger compartment and fixed to the frame. The vehicle dashboard 4 is arranged frontally to the driver DR and to any passenger P and/or, at least partially, between the driver DR and any passenger P.

As illustrated in the non-limiting embodiments of the attached figures, the road vehicle 1 comprises a content display device 5, which is arranged at the vehicle dashboard 4, in particular at a central portion 6 of the vehicle dashboard 4 between a driving position 7 and a passenger position 8.

In particular, the dashboard 4 comprises in turn an exposed surface 9, which can be seen from the inside of the passenger compartment 3, namely from the driving position 7 or from the passenger position 8. More in particular, the exposed surface 9 is substantially the aesthetic finish surface of the dashboard 4, namely the usually curved surface that delimits the top of the dashboard 4. For example, the exposed surface is made of leather, carbon fibre or other composite materials, wood, etc.

Advantageously, the display device 5 comprises a rollable and unrollable projection device 10, which comprises in turn a foldable screen 11. The foldable screen 11 is provided with a rear main surface 12 and a front main surface 13, which is configured to show contents IM to the driver DR and/or to the passenger P.

Preferably but without limitation, the foldable screen 11 is a LED screen, in particular an OLED (organic light-emitting diode) screen.

Furthermore, the projection device 10 comprises a support structure 14 on which the rear main surface 12 of the foldable screen 11 is mounted. In particular, the rear surface 12 is largely covered by the support structure 14. In this way, it is possible to guarantee the necessary rigidity for the foldable screen 11 during the rolling and unrolling operations.

In detail, the support structure 14 can be rolled up around a winding axis A, arranged inside the vehicle dashboard 4.

In the non-limiting embodiments of the attached figures, the winding axis A of the support structure 14 is parallel to the transverse axis T of the road vehicle 1.

In other non-limiting embodiments not illustrated, the winding axis A of the support structure 14 is parallel to the longitudinal axis L, namely to a normal direction of travel of the road vehicle 1.

The dashboard 4 further comprises a through slit 15, provided on the exposed surface 9 and configured to be traversed by the foldable screen 11 and by the support structure 14 during rolling and/or unrolling of the projection device 10.

Advantageously but without limitation, the slit 15 is provided along the transverse axis T of the road vehicle 1, in particular horizontally, namely parallel to a floor F of the road vehicle 1.

In the non-limiting embodiments of the attached figures, the slit 15 is arranged at the central portion 6 of the dashboard 4.

Preferably, the projection device 10 is rolled or unrolled along the same substantially vertical unrolling direction V, namely substantially perpendicular to the floor F of the road vehicle 1.

Figure 2:
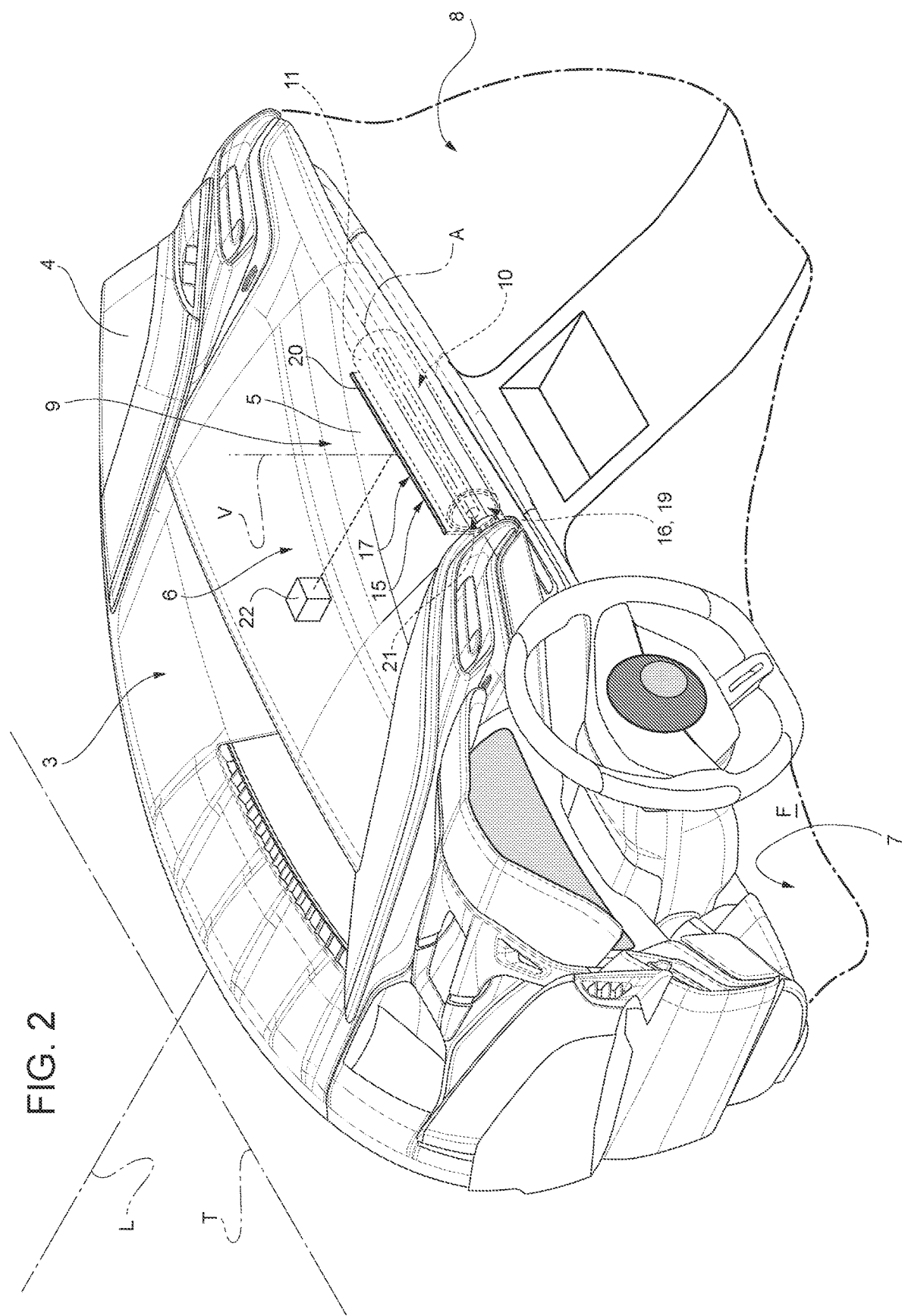
FIG. 2 is a perspective schematic view of part of the interior of the passenger compartment of the vehicle of FIG. 1 in which a central display device can be seen in a first embodiment in a first configuration.
Figure 3:
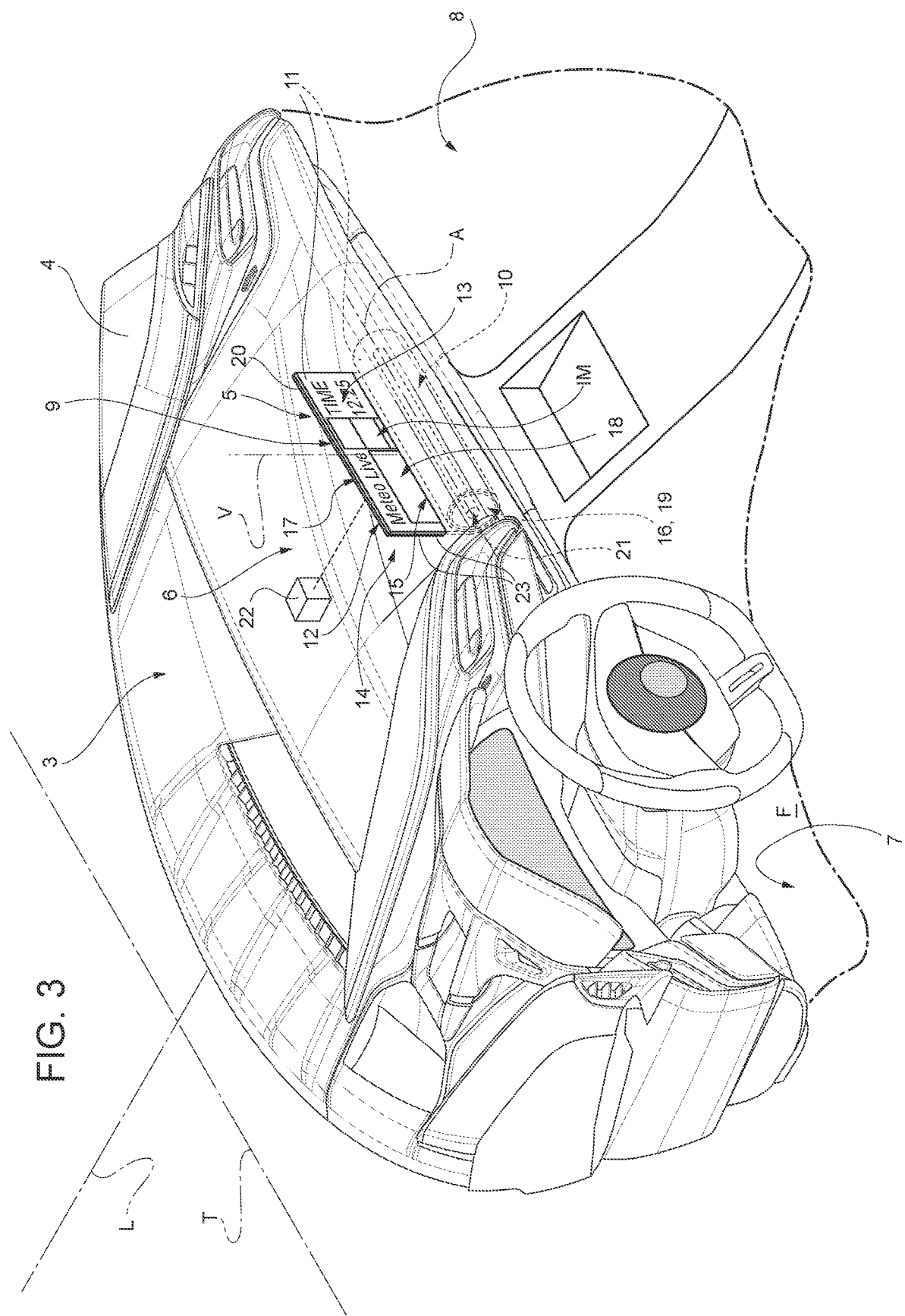
FIG. 3 is a perspective schematic view of part of the embodiment of FIG. 2 in an intermediate configuration.
Figure 4:
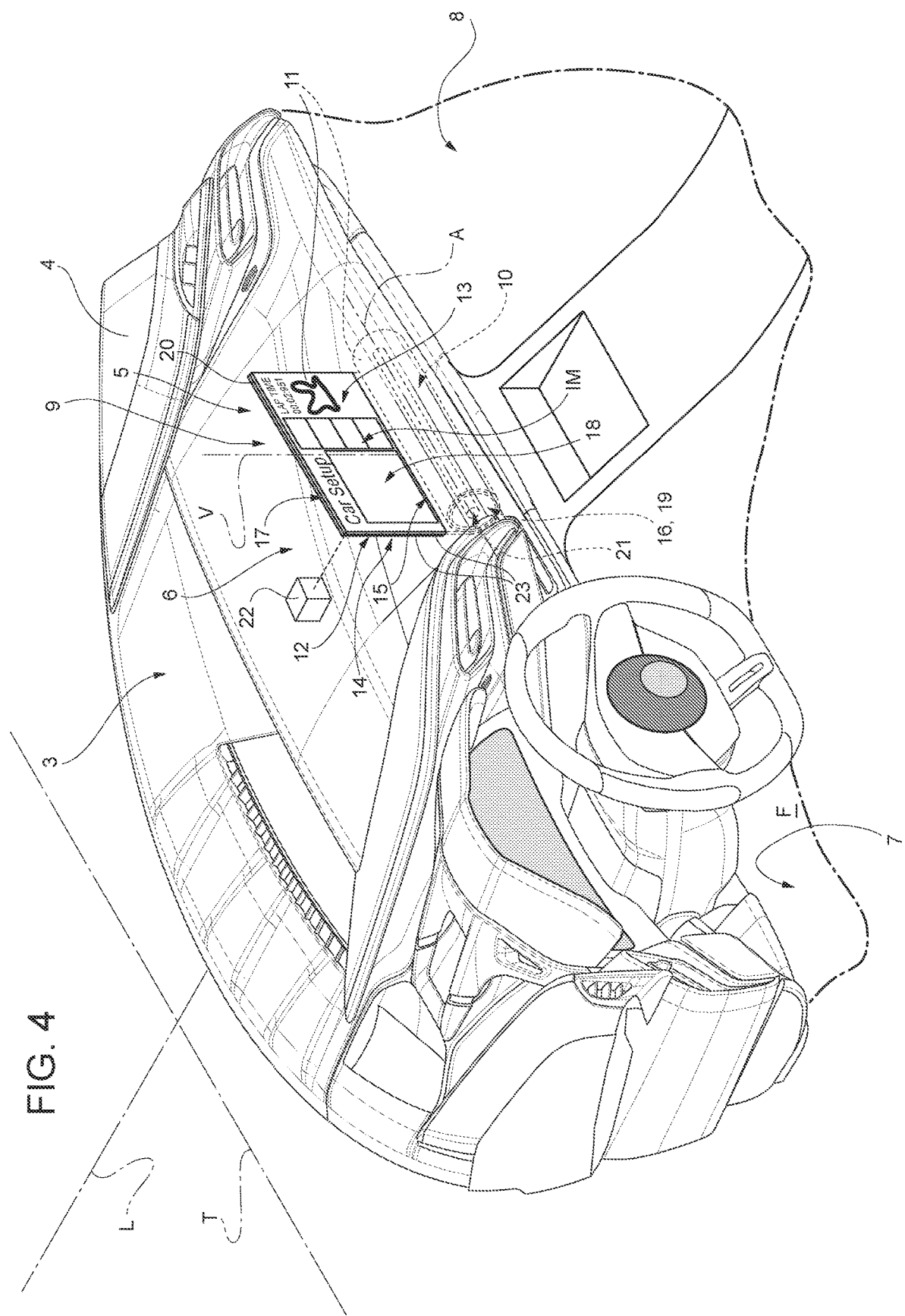
FIG. 4 is a perspective schematic view of part of the embodiment of FIG. 2 in a second configuration.

According to the non-limiting embodiments of FIGS. 2 to 4, the road vehicle 1 comprises a movement system 16 configured to move the support structure 14 to roll and unroll (along the direction V) the projection device 10 between:

a first configuration, illustrated schematically in FIG. 2, in which the foldable screen 11 is concealed inside the vehicle dashboard 4 and a distal end 17 thereof is contiguous to the rest of the exposed surface 9, and a second configuration, illustrated schematically in FIG. 4, in which a portion 18 of the front main surface 13 is outside the dashboard 4 visible to the driver DR and/or to the passenger P.

In particular, therefore, the foldable screen 11 is provided with a distal end 17 and a proximal end 19, which is connected to the movement system 16 and remains constantly inside the dashboard 4, constituting substantially the core of the rolled-up foldable screen 11.

More in particular, the outer portion 18 of the front main surface 13 protrudes from the exposed surface 9, preferably vertically.

Preferably but without limitation, the distal end 17 of the foldable screen 11 comprises a terminal element 20 having the same finish (carbon fibre, metal, glass, wood, plastic, resin, leather, fabric or any other finish) as the rest of the exposed surface 9, which in the first configuration (illustrated in FIG. 2) is arranged contiguous to the rest of the exposed surface 9.

In particular, the terminal element 20 is transverse to the unrolling direction of the projection device 10.

In other words, therefore, the exposed surface 9 integrates the terminal element 20 when the screen 11 is completely rolled up. In particular, the terminal element 20, therefore the screen 11, is indistinguishable from the rest of the exposed surface 9 when the screen 11 is completely rolled up.

In particular, the terminal element 20 is a rigid rod arranged at the top of the outer portion 18 of the screen 11 that projects from the dashboard 4.

In some preferred non-limiting cases, the movement system 16 comprises an actuator device 21, in particular an electric motor, configured to roll and unroll the projection device 10. In detail, advantageously but without limitation, the actuator device 21 rolls and unrolls the foldable screen 11 since it is connected to the proximal end 19, consequently pushing the support structure 14 as indicated below.

Preferably but without limitation, the actuator device 21 is configured to move the support structure 14 from the first configuration to the second configuration when the road vehicle 1 is switched on and, vice versa, when the road vehicle 1 is switched off.

Alternatively or additionally, the actuator device 21 can be operated by the driver DR and/or by the passenger P by means of an appropriate command.

Advantageously but not necessarily, the road vehicle 1 comprises a control unit 22 configured to selectively enable and disable the projection device 10 in the second and in the first configurations respectively.

Preferably, the control unit 22 is configured to enable only part of the projection device 10; namely to show the contents IM only on the portion (18) of the front main surface 13 outside the dashboard 4, leaving the portion inside the dashboard 4 disabled.

In this way, it is possible to save energy and preserve the electronic components, since the foldable screen 11 is substantially switched off if it is in a position not visible to the driver DR or to the passenger P, namely inside the dashboard 4.

Physically, without limitation, the control unit 22 can be composed of one single device or several devices separate from one another and communicating through the CAN or Ethernet network of the road vehicle 1.

According to some preferred non-limiting embodiments, as illustrated in FIGS. 3 and 4, the control unit 22 is configured to vary the contents between the second configuration and a third configuration in which the size of the portion 18 of the front main surface 13 outside the dashboard 4 is larger or smaller than that of the second configuration. In particular, considering as second configuration the one illustrated in FIG. 4, in which the portion 18 (at its maximum extension) shows complete contents, for example relative to the vehicle conditions, the third configuration can be the one illustrated in FIG. 3, in which the portion 18 (at an intermediate extension thereof) shows limited contents, for example relative to the weather conditions. In this way, the driver DR can select the information and the size of the outer portion 18 based on his preferences and/or mission (for example varying between driving on a road open to traffic and a racing circuit).

In some preferred non-limiting cases, the support structure 14 is a shutter structure. In particular, the support structure 14 comprises a plurality of rods 23 arranged parallel to one another and transversely to the unrolling direction V of the projection device 10. More in particular, the rods 23 are connected to one another so as to have a rotational degree of freedom transverse, in particular perpendicular, to the unrolling direction V of the projection device 10 (in other words, two contiguous rods are hinged to each other so that they can rotate whit each other around an axis parallel to the winding axis A). In this way, it is possible to guarantee sufficient rigidity of the support structure 14 and therefore a correct vertical and planar extension of the outer portion 18 of the foldable screen 11.

In further non-limiting embodiments not illustrated, the dashboard 4 comprises a central tunnel, namely the structure between the driving position 7 and the passenger position 8 with longitudinal extension, along the axis L.

In particular, in said embodiments the display system 5 is arranged at the upper surface of the central tunnel, namely the slit 15 is provided on said surface. More in particular, without limitation, the axis A of the support element 14 can also be parallel to the longitudinal axis L and therefore the support structure 14 extends along a plane parallel to the normal direction of travel of the road vehicle 1.

In use, while driving, the driver DR and the passenger P can easily view the outer portion 18. In particular, the projection device 10 projects and varies the contents IM according to the vehicle conditions (for example speed, accelerations applied, torque delivered, etc.). In particular, when the road vehicle 1 is switched on, the proximal end of the foldable screen 11, namely of the support structure 14, rotates around a pin (substantially corresponding to the winding axis A) to pass from the first configuration to the second (or third) configuration. In other words, with the vehicle switched off or according to the preference of the driver DR or the passenger P, the display device 5 can be concealed inside the dashboard, and the slit 15 is closed by the terminal element 20, preferably corresponding to the same finish as the rest of the exposed surface 9 of the dashboard 4.

Preferably, the display devices 5 described above are also used to provide the driver DR with suggestions for driving on a racing circuit, for example of the type described in the Italian application 102021000025037 by the same Applicant.

Although the invention described above makes particular reference to a precise embodiment example, it should not be considered limited to said embodiment example, since its scope includes all the variations, modifications or simplifications covered by the attached claims such as, for example, a different type of road vehicle (for example with front wheel drive), a different shape of the passenger compartment, a different type of projection surface or device, an extreme curvature of the exposed surface, etc.

The vehicle described above has numerous advantages.

Firstly, it minimizes the overall dimensions of the display device within the dashboard.

In addition, the harmony of forms inside the passenger compartment is improved due to the absence of an external screen and the continuity of finish of the dashboard provided by the terminal element.

Furthermore, it improves flexibility in the design of road vehicle interiors, since the dashboard and the shapes thereof are no longer constrained by the presence of a large flat rectangular screen in the central portion.

LIST OF REFERENCE NUMBERS OF THE FIGURES 1 vehicle
2 wheels
3 passenger compartment
4 dashboard
5 display device
6 central portion
7 driving position
8 passenger position
9 exposed surface
10 projection device
11 foldable screen
12 rear surface
13 front surface
14 support structure
15 slit
16 movement system
17 distal end
18 outer portion
19 proximal end
20 terminal element
21 actuator device
22 control unit
23 rods
A winding axis
DR driver
F vehicle floor
IM contents
L axis
P passenger
T axis
V vertical direction

The invention claimed is:

1. A road vehicle (1) comprising:
four wheels (2), of which at least one pair of wheels (2) is driven;
a passenger compartment (3) configured to accommodate a driver (DR) and at least one passenger (P) alongside the driver (DR);
a vehicle dashboard (4), comprising in turn an exposed surface (9) visible from within the passenger compartment (3);
a content display device (5) comprising:
a projection device (10) which can be rolled up and unrolled, which comprises a foldable screen (11) provided with a rear main surface (12) and a front main surface (13) configured to display contents (IM) to the driver (DR) and/or to the passenger (P);
the projection device (10) further comprising a support structure (14) on which the rear main surface (12) of the foldable screen (11) is mounted;
the support structure (14) is a shutter structure being rollable and unrollable around a winding axis (A), arranged within the vehicle dashboard (4), wherein the support structure (14) comprises a plurality of rods (23) arranged parallel to each other and transverse to an unrolling direction (V) of the projection device (10); the rods (23) being connected to each other so as to have a rotational degree of freedom transverse, in particular perpendicular, to the unrolling direction (V) of the projection device (10);

the vehicle dashboard (4) further comprising a slit (15) on the exposed surface (9) configured to be traversed by the foldable screen (11) and by the support structure (14) during the rolling up and/or unrolling of the projection device (10);

wherein the distal end (17) of the foldable screen (11) comprises a terminal element (20) having the same finish as the rest of the exposed surface (9), which in the first configuration is arranged contiguous to the rest of the exposed surface (9).

2. The road vehicle (1) according to claim 1, and comprising a movement system (16) configured to move the support structure (14) for rolling up and unrolling the projection device (10) between:

a first configuration, wherein the foldable screen (11) is hidden within the vehicle dashboard (4) and a distal end (17) thereof is contiguous to the rest of the exposed surface (9), and a second configuration, wherein a portion (19) of the front main surface (13) is outside the dashboard (4) visible to the driver (DR) and/or passenger (P).

3. The road vehicle (1) according to claim 2, wherein the movement system (16) comprises an actuator device (21), in particular an electric motor, configured to roll up and unroll the projection device (10).

4. The road vehicle (1) according to claim 1 and comprising a control unit (20) configured to selectively enable and disable the projection device (10) in the second and first configurations respectively.

5. The road vehicle (1) according to claim 4, wherein the control unit (22) is configured to enable only part of the projection device (10); namely, to display the contents (IM) only on the portion (18) of the front main surface (13) outside the dashboard (4), leaving the portion inside the dashboard (4) disabled.

6. The road vehicle (1) according to claim 4, wherein the control unit (22) is configured to vary the contents between the second configuration and a third configuration wherein the size of the portion (18) of the front main surface (13) outside the dashboard (4) is larger or smaller than that of the second configuration.

7. The road vehicle (1) according to claim 1, wherein the slit (15) is made along a transverse axis (T) of the road vehicle (1), in particular horizontally.

8. The road vehicle (1) according to claim 1, wherein the projection device (10) is rolled up or unrolled along the same substantially vertical unrolling direction (V).

* * * * *